C. B. Hutchinson.

Cider Press.

No. 3,830. Reissued Feb. 8, 1870.

Witnesses
Chas. F. Spencer
R. F. Osgood.

Inventor
C. B. Hutchinson.
by J. Fraser Rec. Attys.

N. PETERS, PHOTO-LITHOGRAPHER, WASHINGTON, D. C.

United States Patent Office.

C. B. HUTCHINSON, OF AUBURN, NEW YORK.

*Letters Patent No.* 37,579, *dated February* 3, 1863; *reissue No.* 3,830, *dated February* 8, 1870.

IMPROVED MACHINE FOR GRINDING AND PRESSING APPLES, GRAPES, &c.

The Schedule referred to in these Letters Patent and making part of the same.

*To all whom it may concern:*

Be it known that I, C. B. HUTCHINSON, of Auburn, in the county of Cayuga, and State of New York, have invented certain new and useful Improvements in Machines for Grinding and Pressing Grapes, Apples, &c.; and I do hereby declare that the following is a full, clear, and exact description thereof, reference being had to the accompanying drawings and to the letters of reference marked thereon, which form a part of this specification, and in which—

Figure 4:
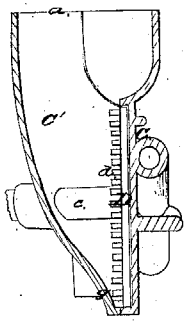
Figure 5:
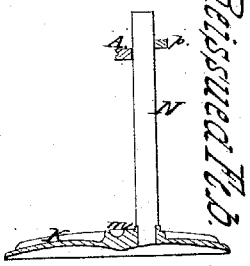
Figure 1:
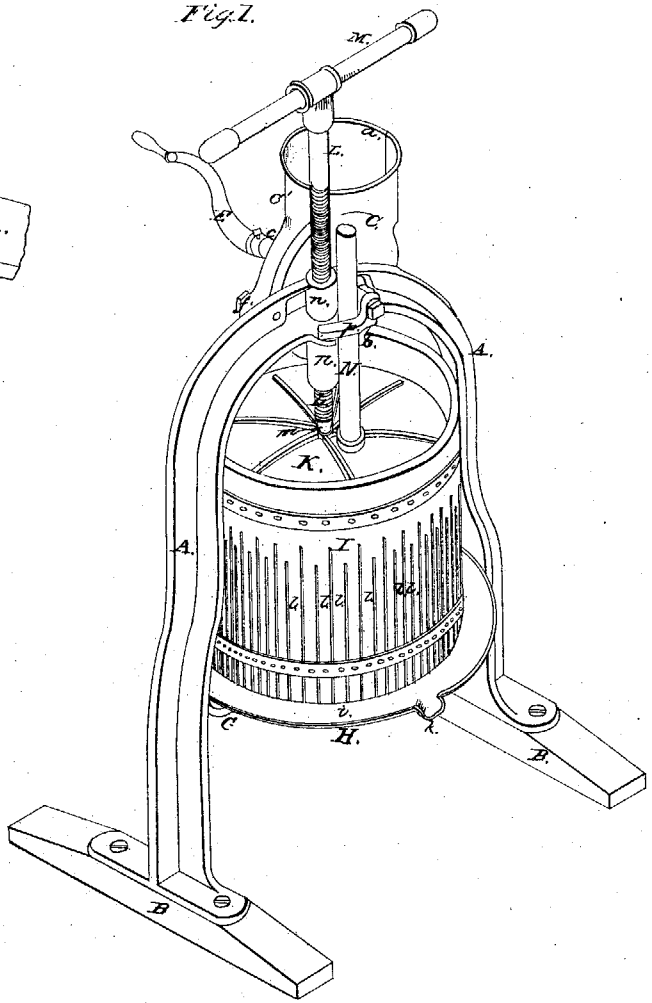
Figure 2:
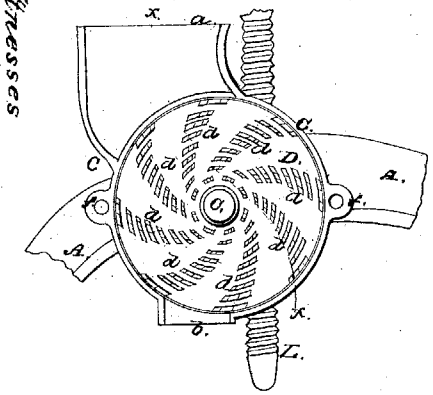
Figure 3:
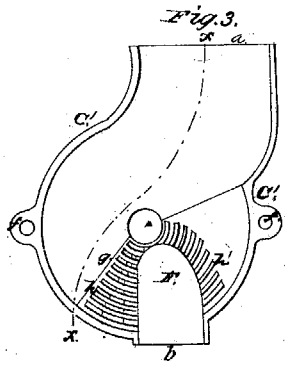

Figure 1 represents a perspective of my machine;

Figure 2, an enlarged elevation of the inside of one section or half of the hopper with a portion of the frame detached, and with the grinding-wheel in place, the other half of the hopper being removed;

Figure 3, a similar elevation of the inside of the other section or half of the hopper, detached;

Figure 4, a section of the hopper in the path of the curve line *x x*, figs. 2 and 3; and Figure 5, a central vertical section of the follower, with its guide-stem in elevation.

Like letters of reference indicate corresponding parts in all the figures.

The nature of my invention consists in certain new and useful improvements in cider or wine-mills, and relates more particularly to the detail and combination of parts than to the general principle of the implement.

To enable others skilled in the art to which my invention appertains, to make and use the same, I will now describe its construction and operation.

The working-parts are connected with a suitable frame, A, secured to base B B, which is usually of arched or rounded shape at its top, as seen in the drawings. The mere form or shape of this frame, or the manner of attaching the working-parts thereto, is not essential. Any suitable frame or support may be used.

On one side of the frame A is situated one section or half, C, fig. 2, of the hopper and case into which the fruit is placed for grinding.

This hopper and case consists of an induction-opening, *a*, at the top, and an eduction-outlet, *b*, at the bottom, the intermediate space being occupied by a circular area of suitable extent, within which rests a grinding-wheel, D, provided with a shaft, *c*, extending outward, and having attached thereto a winch, E, by which it is operated.

On the face of the grinding-wheel are made sets *d d* of projecting teeth, of suitable shape and size for the purpose designed, diverging from the centre outward to the periphery, as represented. The number of sets, or the number of teeth in a set may be varied, as convenience or necessity may require. The teeth of each set are separated from each other by a space a little greater than the thickness of the teeth themselves.

The other section or half C′ of the hopper and grinding-case, fig. 3, is of the same form in outline as that already described, and it has a central hole and bearing for the shaft of the grinding-wheel to pass through, so that the two sections can fit closely together, when they are secured by means of bolts passing through lugs *f f* at the sides, or by any other suitable means.

The lower portion of this half of the hopper, around the eduction-outlet, is made plane, of suitable extent, so as to fit closely to the teeth of the grinding-wheel; but above this surface the space in the hopper, from its top downward to the point *g* of the plane, is made in the form of a wedge, as indicated in figs. 3 and 4.

At a suitable position within the plane portion of this half of the hopper the eduction-passage extends upward, forming an opening or depression, F, of suitable size to insure the proper discharge of the pomace, as will presently be described.

On one side of this opening or depression on the plane surface, are suitable teeth *h*, similar to those on the grinding-wheel, but alternating with them, so that those of one part shall pass between those of the other, and *vice versa*.

On the other side of this opening is another set of teeth, *h′*, designed more especially to remove any pomace that may adhere to the teeth of the grinding-wheel, after they have passed the discharge-opening.

The arrangement above described insures a rapid and effective grinding of the fruit, and also a perfect discharge from the grinding-wheel. The fruit, as it is fed in, is caught and carried downward by the teeth of the grinding-wheel, and as it is forced along the decreasing wedge-space of the hopper, it is broken and crushed before it reaches the stationary teeth *h*. Here, by the intermatching of the two sets of teeth, it is ground into a pulp, and escapes into the discharge-opening F. That which still adheres to the wheel and is carried over the discharge-aperture is cleaned off by the intermatching with the raking-teeth *h′* on the other side, so that when the wheel comes up again it is comparatively free.

In ordinary devices the discharge is at the periphery or edge, and is so imperfect as to cause clogging or choking, and in this condition the fruit will not run down the hopper rapidly, from the teeth not catching it. By making the discharge on the face of the wheel instead of the periphery, a perfect discharge is insured, as when the wheel comes opposite that point it is perfectly free and open. By their peculiar curved shape, the sets of teeth on the grinding-wheel act similarly to a screw, to draw the fruit downward into the wedge-space of the hopper, and thus assist in rapidity of grinding.

At the proper position on the frame is situated a cross-piece or support, G, fig. 1, and on this rests a pan or bed, H, usually of circular form and suitable diameter, having a groove, *i*, near its edge, and a spout, *k*, on one side, for the discharge of the liquid as it is expressed.

On this pan, inside the groove *i*, and under the hopper, rests a curb or receptacle, I, open at both ends, and of proper capacity for containing the pomace while it is being pressed. This curb, instead of having its slats *l l* for the escape of the juice extend entirely from bottom to top, the whole height, has them extend only a portion of the distance, say about three-quarters, more or less, thus leaving the top entire and unbroken, as clearly represented in fig. 1. This arrangement is important on several accounts. While it allows the free passage of the liquid as it is expressed, it prevents the cloth that is placed over the pomace and under the follower from becoming torn and worn by catching into the slots, as it would do if they extended entirely to the top, and thus avoids much trouble. The upper edge, by being unbroken, presents a smooth surface to the cloth, which, by the time the compression has reached the slots below, has become so fixed in place that it does not enter them. In addition to this, the curb is much stronger than if entirely divided into narrow strips or staves, with intermediate spaces, and the cost of construction is lessened, there being much less labor in preparing the staves, and it, furthermore, requiring a smaller number of screws or bolts to secure the staves to the hoops.

In the open end of the curb fits a follower, K, having a central bearing, *m*, on top, in which rests simply, while pressing, the end of a screw, L, extending upward through a screw-socket or nut, *n*, cast in and forming a part of the frame, and thence to a suitable height, and having a cross-head, in the socket of which rests a lever, M, by which the power is applied. I make the follower concave or hollowing on its under side, as seen in fig. 5, for the purpose of lessening the direct pressure against the sides of the curb, by having a tendency to draw the mass inward toward the centre, and thus insure a more equal vertical pressure. By this arrangement the follower, also, is kept more steadily in place during the act of pressing, and is less liable to become inclined in one direction or another from the desired horizontal position, by forming a hardened convex bed in the mass.

I have devised another method of giving the follower steadiness, and to prevent tilting in the process of pressing. I secure a vertical guide-stem, N, figs. 1 and 5, to the follower, at a little distance to one side of the centre, to be out of the way of the screw, of suitable height for the purpose designed, so as to serve as a handle for removing or replacing the follower in the curb, and also serve to steady the follower and prevent its tilting during the process of pressing. It will be seen, this guide-stem is applicable to any kind of a follower usually used in portable mills.

To avoid the necessity of holding the guide-stem by the hand of the operator during the process of pressing, I extend it upward, and construct the parts so the stem will rest against some part of the mill or press. When so constructed, the follower being placed in the curb, the pressing will go forward, and the follower will be kept in proper position without further attention.

A half circular bearing in the frame A, and having a button or catch, P, resting against its outer side, and hooking into the frame to hold in place, as represented in fig. 1, is a good way to hold this guide-stem. The essential feature is, that it shall rest against the mill so as to steady the follower, and the mere manner of doing this can be varied without changing the principle of operating.

Having thus described my invention,

What I claim as new, and desire to secure by Letters Patent, is—

1. The combination and arrangement of a grinding-mill and press, together with the several parts, constructed substantially as described and for the purpose set forth.

2. The grinding-apparatus herein shown, provided with the side opening or depression, when attached to the press screw, the whole attached to the legs, which, also, carry the curb.

3. The guide-stem N, in combination with the follower K, when said stem is so arranged as to extend up and rest against the mill so as to prevent tilting and avoid the necessity of steadying by the hand of the operator, as herein shown and described.

C. B. HUTCHINSON. [L. S.]

Witnesses:

F. G. DAY,

E. L. HUTCHINSON.